(No Model.) 2 Sheets—Sheet 1.
G. KELSEY.
COOKING DEVICE.
No. 519,580. Patented May 8, 1894.
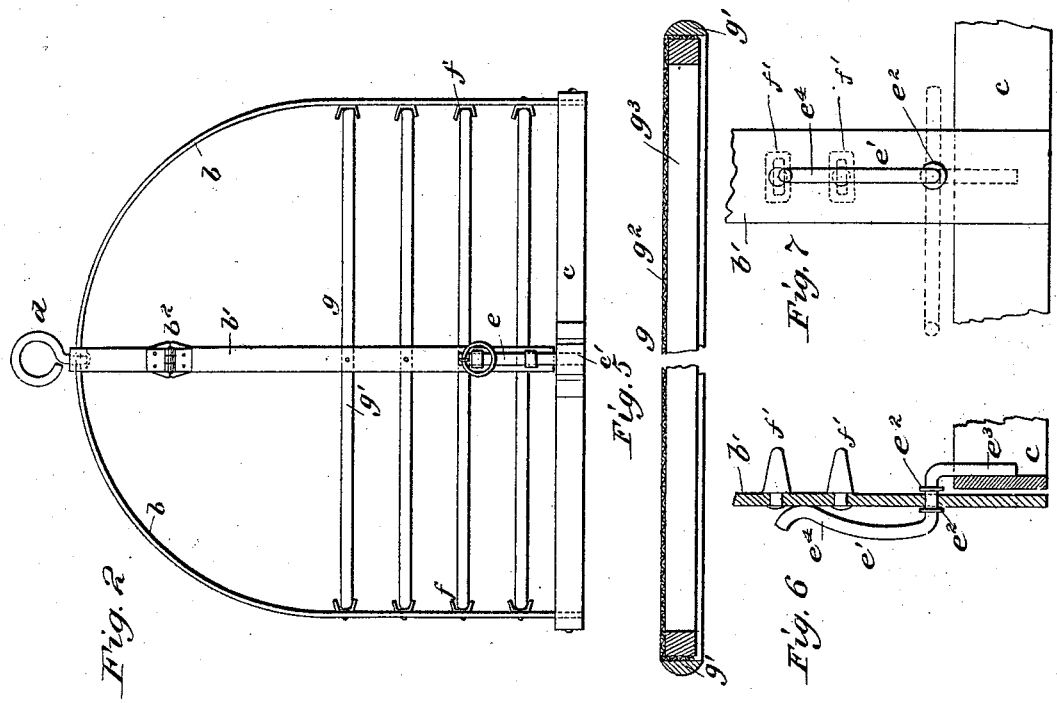
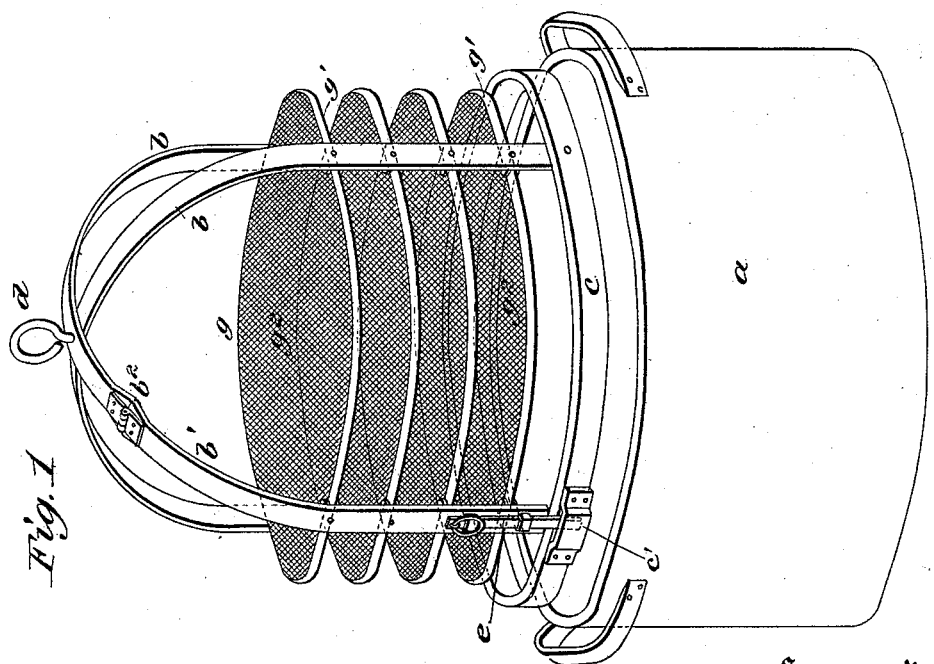
Witnesses
J. P. Coleman
Harry G. Davis
Inventor
George Kelsey
by Wm. N. Finckel
his Atty (No Model.) 2 Sheets—Sheet 2.

G. KELSEY.
COOKING DEVICE.

No. 519,580. Patented May 8, 1894.

Witnesses
J. F. Coleman
Harry G. Davis

Inventor
George Kelsey
by Wm. H. Fincuel
his atty.

THE NATIONAL LITHOGRAPHING COMPANY,
WASHINGTON, D. C.

UNITED STATES PATENT OFFICE.

GEORGE KELSEY, OF LITTLE FALLS, NEW YORK.

COOKING DEVICE.

SPECIFICATION forming part of Letters Patent No. 519,580, dated May 8, 1894.

Application filed November 24, 1893. Serial No. 491,820. (No model.)

*To all whom it may concern:*

Be it known that I, GEORGE KELSEY, a citizen of the United States, residing at Little Falls, in the county of Herkimer and State of New York, have invented a certain new and useful Improvement in Cooking Devices, of which the following is a full, clear, and exact description.

The object of this invention is to provide a device whereby large quantities or numbers of cakes or other edibles may be cooked by submersion in boiling or hot lard or other greasy or oily matter and be readily and safely handled and cooked uniformly.

The invention consists of a skeleton frame or carrier, provided with a number of foraminous or reticulated shelves or trays to receive the cakes or other edibles and support them, while being cooked, in a condition to be submerged in and wholly surrounded by the hot fat, the shelves or trays and their contents being held against displacement while in the kettle or vessel containing the hot cooking material, and the frame having a movable member to facilitate the insertion and removal of the shelves or trays and to lock them in the frame, all as I will proceed now more particularly to set forth and finally claim.

Figure 4:
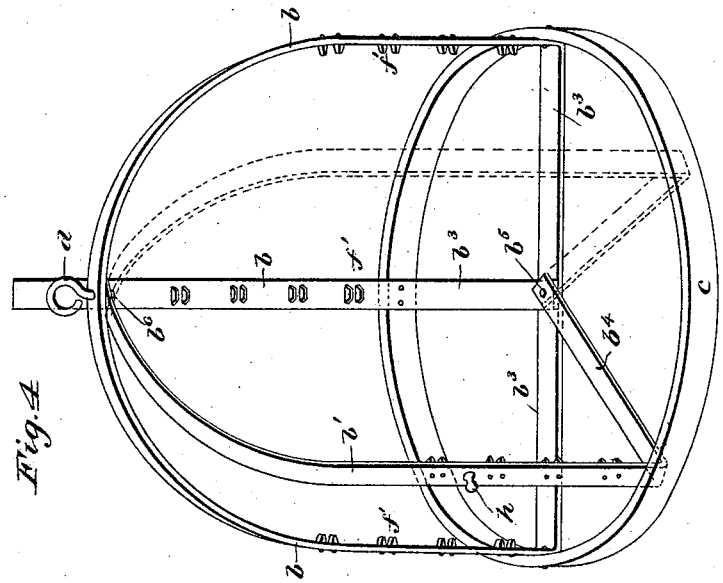
Figure 3:
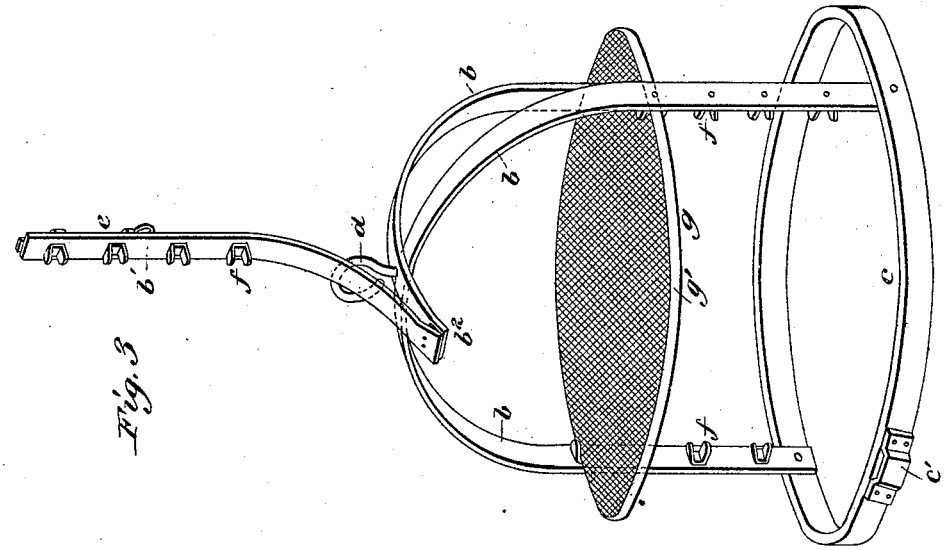

In the accompanying drawings illustrating my invention, in the several figures of which like parts are similarly designated, Figure 1 is a perspective view of my cooking device and a cooking kettle. Fig. 2 is a side elevation of the frame or carrier filled with shelves. Fig. 3 is a perspective view of the carrier or frame showing one form of movable member, the same being that shown in Figs. 1 and 2. Fig. 4 is a similar view of a modified form. Fig. 5 is a cross-section on a larger scale of one of the shelves or trays, to illustrate its mode of construction. Fig. 6 shows, in sectional elevation, first a modified form of locking device for the movable member and second the modified form of (pin) brackets shown in Fig. 4; and Fig. 7 is a front elevation of the parts shown in Fig. 6, The device $a$ may be any suitable kettle or other vessel for containing boiling or hot lard, fat, or other greasy or oily matter, and adapted to be placed upon a heating stove, range, or other heating apparatus, and to receive the cooking device of this invention. This cooking device comprehends a skeleton frame or carrier composed of uprights $b, b'$, rising from and secured to a base ring or band $c$, these parts being of sufficient size and of metal in order to secure necessary rigidity and strength.

$d$ is an eye or hook arranged at the top of the carrier by which it may be suspended, as will presently appear. The upright $b'$ is hinged at $b^2$ to its companion upright by any suitable hinge, so as to be capable of being swung into the closed position, Figs. 1 and 2, from the open position, Fig. 3, and vice versa, and said upright is provided with a sliding bolt $e$, which engages a keeper $c'$ in or upon the base $c$ to lock this movable upright in closed position, which is the position of parts when the carrier is filled with edibles to be cooked and during the cooking operation. Instead of hinging the movable upright at its upper end, it may be hinged at its lower end and to the band $c$, and have the fastening device at its upper end. A spring bolt may be used, or a locking device, such as shown in Fig. 6, may be substituted, and this latter consists of a piece of spring wire $e'$ passed transversely through the upright $b'$ and held in position therein by collars or washers $e^2, e^2$ fixed thereto upon opposite sides of said upright $b'$, the said wire fastening having the straight locking member $e^3$ to engage the base $c$, and having the curved handle $e^4$ with sufficient elasticity to bind against the upright when moved into parallelism therewith, as in full lines, Figs. 6 and 7, to retain its locking member $e^3$ in engagement with the base $c$, and adapted to be thrown into the dotted line (horizontal) position, Fig. 7, to get free from the said base to permit the upright to be swung out into the position, Fig. 3.

I do not limit my invention to any particular form of locking or fastening device for the movable upright, and show these two forms for illustration merely.

Another form of movable member is shown in Fig. 4, and in the carrier there illustrated the uprights are carried across the bottom, as at $b^3$, and the movable upright $b'$ is provided with a returned portion $b^4$, and this returned portion is pivoted at $b^5$ to the returned portions $b^3$ of the other uprights, and is also pivoted at $b^6$ to the intersecting or meeting portions of the uprights. Thus the upright $b'$ in this case is free to be revolved on a vertical axis toward and from the stationary uprights, as indicated by the full and dotted lines in Fig. 4; these positions shown in the drawings being inoperative positions and so shown, for illustration merely, and to avoid overlapping the other parts; it being obvious that the true closed position of the movable upright is in alignment with the upright $b$ shown in the center of said Fig. 4, and the true open position being a little farther to the right or left than shown. I do not limit my invention to these two forms of movable uprights, but esteem as within my invention any movable member that will subserve the hereinafter described purposes of the movable member, namely, open the carrier to permit the insertion and removal of the shelves or trays, and to hold such trays within the carrier.

I apply herein equally to the movable members of Figs. 1, 2 and 3 and the movable member of Fig. 4, the term swinging or movable upright, and mean to include as within my invention as well both these forms as others that may be devised for opening the carrier to permit the insertion and removal of the shelves or trays presently described and their retention within the carrier.

The uprights are provided with brackets $f$ to receive and support the shelves or trays $g$ in horizontal position. These brackets embrace the upper and lower edges of the shelves or trays and not only support them from descent but also from being raised off their supports. In Figs. 1, 2 and 3, I have shown the brackets as horizontally arranged U-shaped pieces of metal, riveted to the uprights, and in Figs. 4, 6, and 7, I have shown these brackets as composed of pairs of oblong pins $f'$, $f'$, riveted in the uprights; and other forms of shelf or tray-supports may be used so long as they restrain the upward and downward movements of the shelves or trays, the importance of which will presently appear.

The shelves $g$ may be made of any suitable reticulated or foraminous material to permit free access of the hot fat to all parts of the cakes and other edibles to be cooked; but the construction I prefer for economical and other reasons, is illustrated in Fig. 5, wherein $g'$ is a band of metal, $g^2$ a piece of wire netting and $g^3$ an inner clamping or binding ring or spline. These parts may be assembled as follows: Supposing Fig. 5 to be inverted, a piece of wire netting will be laid upon the upper edge of the band $g'$ and then, by means of a suitable press, the ring or spline $g^3$ will be pressed down upon the wire netting and crowd it within the band $g'$ and between said band and the ring or spline $g^3$, and so firmly unite the band, netting and spline.

While the shelves may be used in the imagined inverted position which I have just described, I prefer to use them with the netting on top, as shown in Fig. 5, in order thereby to facilitate the discharge of the cooked edibles. Other forms of shelves may be substituted for these wire-netting shelves, but I believe shelves of the character and construction shown are the best.

The swinging upright shown in Fig. 4 may or may not be provided with a locking device and may or may not have the knob or handle $h$ for operating it.

I have shown my device as circular in outline, but, of course, I do not limit my invention to the shape of the device.

The operation is as follows: Assuming that the device is to be used for cooking crullers or doughnuts, and in a bakery, the kettle $a$ is set upon the heater and a quantity of lard is boiled or heated therein. The trays or shelves are taken out of the carrier and placed in convenient position for the baker to cut out the cakes and place them as cut directly upon the tray. In order to remove the trays from the carrier, the swinging upright is turned aside, as already described, and the carrier tilted in the direction of the opening thus made and the shelves dumped out, or they may be taken out by hand. As the trays are filled with cakes, they are inserted, one by one, in the brackets of the carrier until the carrier is filled, and then the swinging upright is moved into closed position and locked and the carrier full of cakes is taken to the kettle and submerged in the hot lard. The tendency of such cakes is to sink in the lard, and then, as the leaven acts upon the influence of the heat, they rise and float in it as the cooking progresses, and hence, if the trays were not held by their brackets against vertical movement the cakes would tend to crowd them up and out of the kettle. When crullers and doughnuts are thrown separately in the old way, by hand, into a kettle of hot lard, they have to be turned by hand in order to brown on both sides, but since my device keeps them all submerged in the hot fat, and wholly surrounded by such fat, they are "browned" upon both sides and all around simultaneously and without turning. When the cakes are "done" or cooked, the carrier is lifted from the kettle and suspended over it by means of its eye, ring or hook $d$ attached to a suitable support and the adhering fat permitted to drain off back into the kettle, and when thus drained, the loaded carrier is taken to a suitable receptacle for the cooked cakes and tilted so as to throw off the cakes. The carrier may then be opened by swinging back the swinging upright and the trays or shelves then removed and be used again to receive other cakes to be cooked. If two or more such carriers be used, or two or more sets of shelves or trays for a single carrier be used, the baker may be kept constantly busy, without waiting for the cooking of his cakes, and thereby great economy of time is secured.

Thus, from the baker to the purchaser, the cakes need be handled but twice, namely, in cutting out and in packing.

Some of the advantages of my invention are, that by its use better goods are produced and in about a sixth of the time required in comparison with the old way; by draining the fat back into the kettle, there is very considerable saving of it; every cake is cooked uniformly and alike and on both sides simultaneously; it is unnecessary to touch the cakes after placing them on the shelves or trays; and by placing the cakes from the cutter directly upon the extra trays or shelves while a carrier full is cooking, I dispense with trays to receive them while waiting to cook the prior lot. Since lard, fat, or other greasy or oily matter, in a heated condition, evaporates more or less, there is a great saving of same effected by shortening the time required to cook a certain amount of cakes or other edibles.

What I claim is—

1. A cooking device consisting of a skeleton frame or carrier provided with a number of foraminous or reticulated shelves or trays to receive the edibles and support them while being submerged in a hot cooking fluid, the shelves or trays and their contents being held against displacement while in the cooking vessel, and the frame having a movable member to permit the insertion and removal of the shelves or trays and to lock them in the frame, substantially as described.

2. A cooking device comprising a skeleton carrier or frame having a swinging upright to open and close it, removable shelves or trays adapted to be inclosed in said carrier or frame and supports in said carrier for said shelves or trays, substantially as described.

3. A cooking device comprising a skeleton carrier or frame having a swinging upright to open and close it, means to lock said upright in closed position, and removable shelves or trays adapted to be inclosed and supported in said carrier or frame, whereby a carrier full of cakes may be placed in a vessel of hot fat and the cakes cooked while wholly submerged, and held submerged, in such fat, substantially as described.

4. A cooking device consisting of a base, uprights secured to such base and to one another, a swinging upright, means to lock the latter in closed position, trays or shelves, and brackets on the uprights to support such trays or shelves within the frame, substantially as described.

5. A cooking device consisting of a base, uprights secured to such base and to one another, a swinging upright, means to lock the latter in closed position, trays or shelves each composed of an open-work material such as wire netting, and supports on the uprights to support such trays or shelves within the frame, substantially as described.

6. The herein described cooking device comprising an annular base, uprights secured thereto having inwardly extending brackets for holding the shelves, one of such uprights being hinged, and means for locking such hinged upright to the base, and the shelves, as set forth.

In testimony whereof I have hereunto set my hand this 23d day of November, A. D. 1893.

GEORGE KELSEY.

Witnesses:
GEO. D. SMITH,
E. B. WAITE, Jr.